United States Patent
Spaeth

[15] 3,703,225
[45] Nov. 21, 1972

[54] RAILWAY BRAKE GEAR BOTTOM ROD GUARD

[72] Inventor: Irvin J. Spaeth, Chicago, Ill.

[73] Assignee: Evans Products Company, Plymouth, Mich.

[22] Filed: Dec. 28, 1970

[21] Appl. No.: 101,551

[52] U.S. Cl. .................................. 188/210, 188/207
[51] Int. Cl. ............................................. B61h 13/38
[58] Field of Search ............... 188/206, 207, 210, 213

[56] References Cited

UNITED STATES PATENTS

| 976,220 | 11/1910 | Schwartz | 188/210 |
| 1,867,000 | 7/1932 | Crone | 188/210 |
| 2,488,342 | 11/1949 | Spaeth | 188/210 |
| 2,788,869 | 4/1957 | Spaeth et al. | 188/210 |
| 2,795,300 | 6/1957 | Soddy | 188/210 |
| 3,092,213 | 6/1963 | Nelson | 188/210 |

Primary Examiner—Duane A. Reger
Attorney—Bedell & Burgess

[57] ABSTRACT

A safety guard for supporting a railway brake gear bottom rod in the event of failure of its normal support. The guard is made in two pieces readily assembled and disassembled to facilitate its application to and removal from a brake beam.

10 Claims, 9 Drawing Figures

PATENTED NOV 21 1972 3,703,225
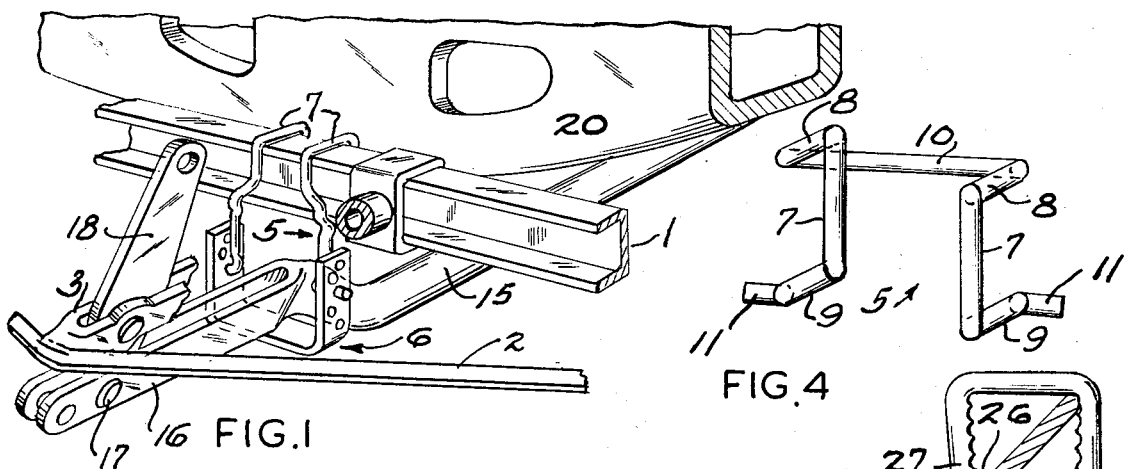
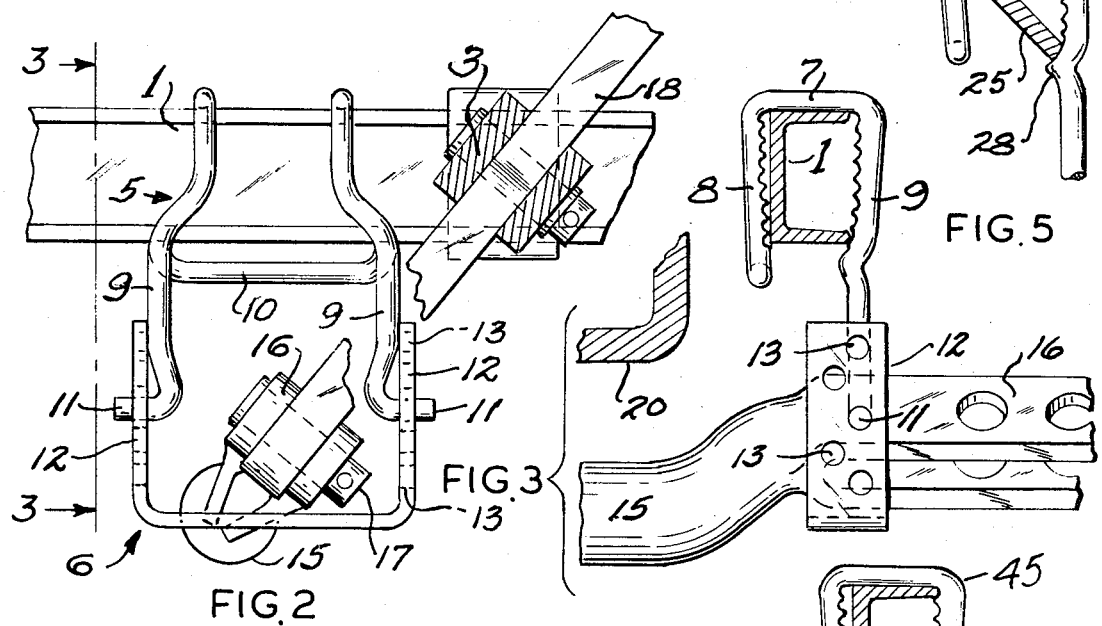
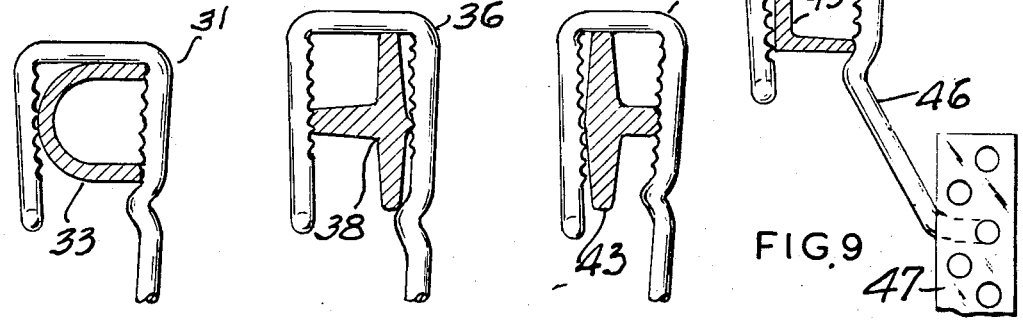
Inventor
Irwin J. Spaeth
By Bedell & Burgess
ATTORNEYS.

3,703,225

RAILWAY BRAKE GEAR BOTTOM ROD GUARD

BACKGROUND OF THE INVENTION

The device is a brake gear bottom rod safety guard of the general type disclosed in U.S. Pat. Nos. 1,724,255; 2,788,869 and 2,795,300, and comprises an upper mounting member adapted for ready application to a brake beam, or other truck part, and a lower stirrup member suspended from the mounting member and affording support for a bottom rod in the event of its dropping from its normal level. The stirrup member may be adjusted vertically on the mounting member and is readily applicable to and removable from the mounting member to facilitate installation and repair or replacement.

Among the objects of the present device are to facilitate installation, to provide for height adjustment of the guard, to avoid vibration or pounding between the bottom rod and the guard, particularly if the guard is supporting the rod, and to avoid damage from snow, ice or other obstructions on the roadbed between the rails.

BRIEF DESCRIPTION OF THE DRAWINGS

FIG. 1 is a perspective of a portion of a railway truck brake gear structure showing the safety guard of the present invention mounted on the channel section compression element of a truss type brake beam and underlying a brake gear bottom rod. The perspective indicates the adjacent lower portion of the truck bolster.

FIG. 2 is a front view of the guard and the beam compression element, and shows the brake beam operating lever and the end of the bottom rod.

FIG. 3 is a vertical section on line 3—3 of FIG. 2.

FIG. 4 is a top view of the mounting member of the guard twisted somewhat from its normal shape for application to the beam channel element so as to effect a tension grip when released.

FIGS. 5, 6, 7 and 8 show the guard mounting member applied to brake beam compression elements of different section.

FIG. 9 illustrates a modified positioning of the stirrup member.

DESCRIPTION OF THE PREFERRED EMBODIMENTS

The guard is readily applicable to an elongated support such as the channel compression element of a truss type brake beam having a tension element 2 and a strut 3. The guard comprises two readily assembled and readily separated members, an upper or mounting member 5 and a lower or stirrup member 6. Upper member 5 is in the form of a pair of inverted U-shaped units spaced apart along the brake beam, each having a crossbar 7, overlying brake beam element 1, a relatively short leg 8 depending from one end of crossbar 7 and a relatively long leg 9 depending from the other end of crossbar 7. An integral bar 10 connects the lower ends of the shorter legs 8. The lower ends of the longer legs 9 terminate in horizontal extremities 11.

The lower or stirrup member 6 has an upright U shape, and is preferably formed of a flat bar, each leg 12 having a double row of holes 13 at staggered intervals for selective insertion of extremities 11 of the mounting member to adjust the height of the stirrup member according to the height of the bottom rod guard 15 which has a clevis or jaw 16 at each end pinned at 17 to the lower end of brake lever 18, and is offset downwardly between its ends to provide clearance for the truck bolster 20, while maintaining the desired height of the brake lever lower end and of the safety guard above the roadbed.

In the event of failure of pin 17 or other support for any portion of the brake gear, bottom rod 15 will drop onto stirrup member 6 which will be free to swing on extremities 11 on the lower ends of legs 9. If the stirrup or bottom contacts an obstruction on the roadbed they may yield lengthwise of the truck.

The mounting member is readily applied to the brake beam or truck part and the stirrup member is readily assembled with the upper member at the selected height so as to underlie the bottom rod during normal operation of the gear, but to secure the bottom rod and other brake parts connected thereto against falling onto the roadbed.

The guard parts may be shipped assembled as shown in FIGS. 1–3. When separated, the mounting member may be dropped over the brake beam compression member and the stirrup member then applied upwardly from below the rod and hinged on the upper member without removing the connection between the bottom rod and brake lever. This is an advantage over a one-piece guard (as shown in the above-mentioned patents) or other guards which require removal and reassembly of the cotters or retaining pins between the bottom rod and the brake levers.

FIG. 5 shows an angle section beam compression element 25 with a corner 26 seated in the recess between two corrugations of a hanger leg 27, and the outer edge of an element leg seated against a protuberance 28 in the other leg of the hanger member.

FIG. 6 shows the application of the guard mounting member 31 to a U-shaped beam element 33.

FIG. 7 shows the mounting member 36 applied to a T-shaped beam element 38.

FIG. 8 shows the mounting member 41 applied to another T-shaped beam compression element 43.

FIG. 9 shows a modified mounting member 45 with its longer leg 46 and the stirrup member 47 offset laterally from a beam compression element 49 to provide increased clearance between the stirrup member and the beam element from which it swings.

Other modifications of the details of the structure may be made without departing from the spirit of the invention and exclusive use of those modifications coming within the scope of the claims is contemplated.

I claim:

1. A railway brake gear bottom rod safety guard formed of two separate members and comprising a downwardly opening U-shaped upper member, with a crossbar adapted to overlie a horizontally elongated truck part, and with depending legs adapted to straddle the truck part, and a separate upwardly opening U-shaped lower member with upwardly extending legs suspended from the legs of said upper member and with a crossbar adapted to underlie a brake gear bottom rod below the truck part.

2. A railway brake gear bottom rod safety guard as described in claim 1 in which the two members have a pivotal connection to each other and the lower member may swing transversely of the upper member.

3. A railway brake gear bottom rod safety guard as described in claim 1 in which the upper member is a rod with a pair of downwardly extending legs spaced apart and having horizontally disposed lower extremities, and the lower member is a flat bar with apertures in its legs for receiving said extremities.

4. A railway brake gear bottom rod safety guard as described in claim 1 in which the legs of the lower member have a series of vertically spaced apertures for selectively receiving the upper member lower extremities to vary the height of the lower member.

5. A railway brake gear bottom rod safety guard as described in claim 3 in which the upper member comprises a pair of inverted U-shaped units spaced apart horizontally and of different lengths with the horizontal extremities on the legs of the longer unit only and with an integral connection between the lower ends of the legs of the shorter unit.

6. A railway brake gear bottom rod safety guard as described in claim 2 in which the legs of the upper member are distortable away from each other when applied to the truck part to yieldingly grip the truck part between them.

7. A railway brake gear bottom rod safety guard as described in claim 4 in which the apertures in each lower member leg are arranged in two vertical rows and the apertures in one row are staggered vertically relative to apertures in the other row.

8. In combination, a railway brake beam compression element, a brake lever fulcrumed thereon and extending downwardly therefrom, a brake gear bottom rod connected to the lower end of said lever and extending horizontally therefrom for connection to another brake lever, and a safety guard for said bottom rod formed of two separate members and comprising a downwardly open U-shaped mounting member with a crossbar overlying said beam compression element and with depending legs straddling said beam compression element, there being an upwardly open stirrup member with upwardly extending legs suspended from the legs of said mounting member and with a crossbar underlying said bottom rod, said stirrup being pivoted on the legs of said mounting member to swing transversely of the length of said beam compression element.

9. A combination as described in claim 8 in which one leg of the mounting member terminates above the level of the bottom rod and the stirrup member suspended from the mounting member underlies the end of the bottom rod.

10. A combination as described in claim 9 in which the lowermost part of the inverted U-shaped mounting member and the stirrup member suspended therefrom are offset laterally from the beam compression element.

* * * * *